R. M. BICKLEY.
BATCH MIXER.
APPLICATION FILED DEC. 2, 1907.
1,046,248.
Patented Dec. 3, 1912.
3 SHEETS—SHEET 3.
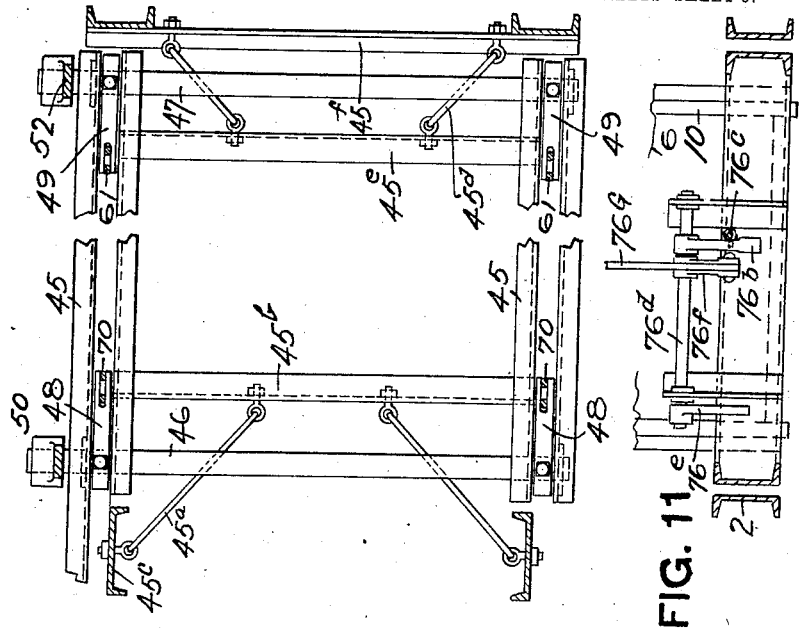
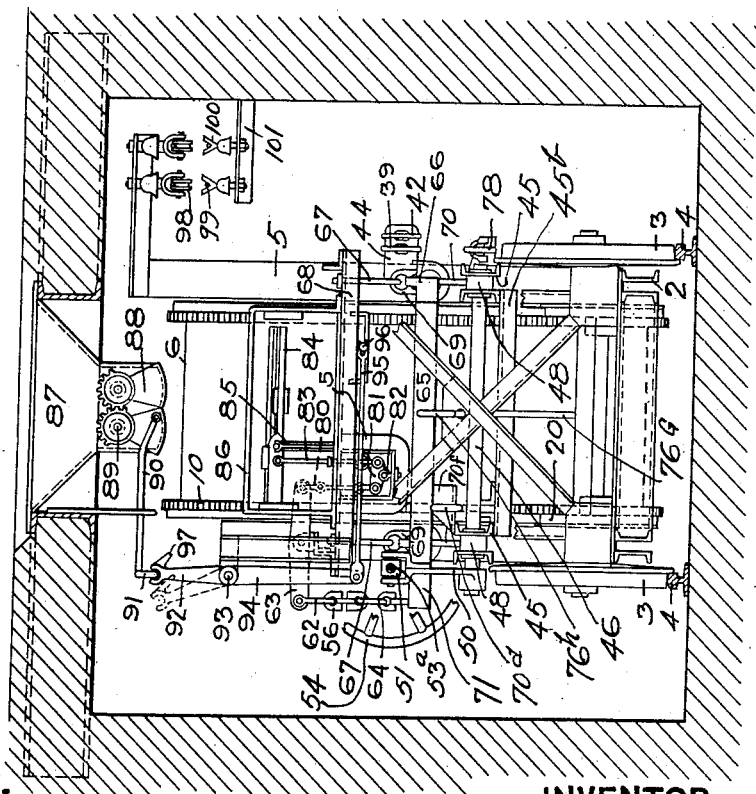
WITNESSES.
INVENTOR.

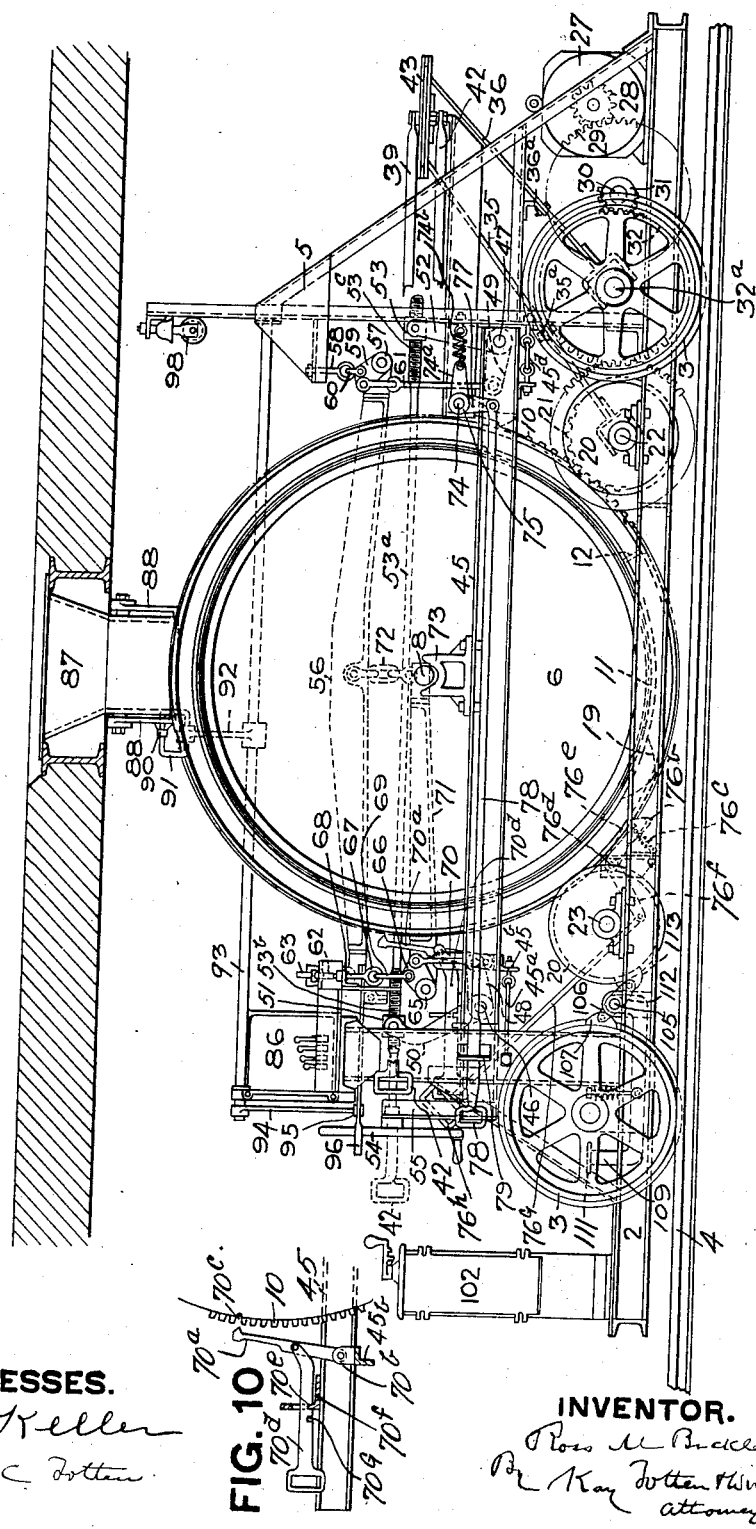

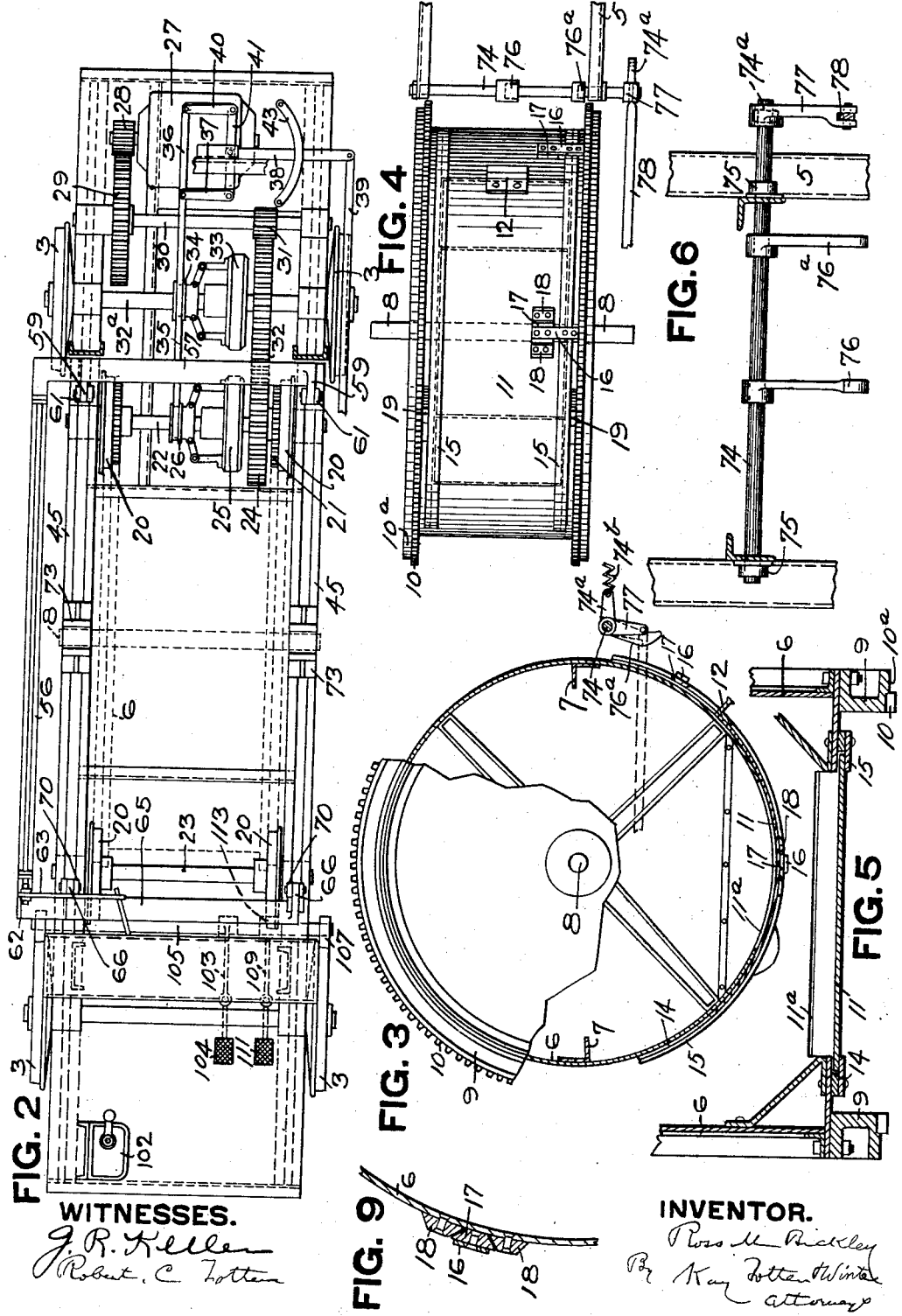

UNITED STATES PATENT OFFICE.

ROSS M. BICKLEY, OF PITTSBURGH, PENNSYLVANIA, ASSIGNOR TO HEYL & PATTERSON INCORPORATED, OF PITTSBURGH, PENNSYLVANIA, A CORPORATION OF PENNSYLVANIA.

BATCH-MIXER.

1,046,248.   Specification of Letters Patent.   Patented Dec. 3, 1912.

Application filed December 2, 1907. Serial No. 404,679.

*To all whom it may concern:*

Be it known that I, ROSS M. BICKLEY, a resident of Pittsburgh, in the county of Allegheny and State of Pennsylvania, have invented a new and useful Improvement in Batch-Mixers; and I do hereby declare the following to be a full, clear, and exact description thereof.

My invention relates to mixers adapted to be used in connection with the mixing of a batch in the manufacture of glass, although I do not wish to restrict myself to any particular use.

The object of my invention is to provide a rotary mixer which may be brought up to position beneath the hoppers containing the ingredients to be mixed to receive and weigh the same, and then be conveyed to the next hopper to receive and weigh a certain portion of another ingredient, and so on, the mixing of the materials taking place if desired, as the apparatus moves to the point of use, thereby saving a great deal of time and labor.

To these ends my invention comprises the novel features hereinafter set forth and claimed.

In the accompanying drawing Figure 1 is a side elevation of my improved batch mixer; Fig. 2 is a plan view partly in section showing the rotary cylinder in dotted lines; Fig. 3 is an enlarged detail partly in cross section of the rotary cylinder and the mechanism for opening and closing the door; Fig. 4 is a bottom view of the cylinder; Fig. 5 is a sectional detail of a portion of the cylinder; Fig. 6 is an enlarged detail of the trip mechanism for opening and closing the door; Fig. 7 is a detail; and Fig. 8 is an end view; and Figs. 9, 10 and 11 are detail views.

In the drawing the numeral 2 designates a suitable truck provided with the wheels 3 adapted to travel on the track 4. Erected on the truck 2 is the frame 5 which is made up of angle bars suitably riveted together and braced to make a substantial structure. The mixing cylinder 6 which is carried by said truck 2 may be built up in any suitable manner braced internally by the mixing blades 7, and provided with the trunnions 8. Secured to the circumference of the cylinder 6 are the rings 9 with the gear-teeth 10 formed therein and having the plane face $10^a$ resting in the wheels 20 when the cylinder is revolved. The cylinder is provided with an opening $11^a$ which is provided with the sliding door 11. This door is provided with the lug 12 having a beveled head. The door 11 moves in door guides 14 made up of the strips 15 secured to the cylinder. Two spring bars 16 are secured to the cylinder, said spring bars having the bevel lugs 17 which are adapted to slide over and engage the bevel lugs 18 on the door 11. The cylinder is also provided with the enlargements 19 at opposite ends of said cylinder for the purpose fully hereinafter set forth.

The cylinder 6 is normally supported by the wheels 20 mounted on the shaft 22 and idler axle 23. Formed on said wheels are the gears 21 which engage the gear-teeth 10 formed on the cylinder 6 and by means of which rotary movement is imparted to said cylinder. On the shaft 22 is the loose gear 24 with which a suitable sliding clutch 25 is adapted to engage, said clutch being provided with the clutch ring 26.

Mounted on the truck is the motor 27 which has on its shaft the pinion 28 adapted to engage with the gear wheel 29 on the shaft 30. The pinion 31 on the shaft 30 engages with the gear wheel 32 on the axle $32^a$. This gear wheel 32 is loose on said axle and a suitable sliding clutch 33 on said axle is adapted to be thrown into engagement with said gear wheel. The clutch 33 is provided with the clutch ring 34. Bifurcated rods 35 and 36 engage the clutch rings 26 and 34, respectively, said rods being pivoted at $35^a$ and $36^a$ to the frame 5. A link 37 connects the rod 35 to the bell crank 38 and connected to said bell crank is the operating rod 39. A link 40 connects the rod 36 to the bell crank 41 and to said bell crank is connected the operating rod 42. These operating rods extend to the forward end of the truck and are supported by the bracket 44. A circular guide bar 43 is provided for the bell cranks 38 and 41.

Channel bars 45 extend longitudinally of the frame, said channel bars being connected by the shafts 46 and 47 to form a frame. Levers 48 and 49 are connected to the shafts 46 and 47, respectively, at opposite ends thereof. An arm 50 is secured to one end of the shaft 46 and at the upper end of said arm is the threaded nut 51. Secured to one of the ends of the shaft 47 is an arm 52 provided with a threaded nut 53. A rod 53ᵃ has threaded portions 53ᵇ and 53ᶜ. The threaded portion 53ᵇ is threaded in one direction and engages the nut 51, while the threaded portion 53ᶜ is threaded in the opposite direction and engages the nut 53. The outer end of the rod 53ᵃ is supported by the plate 55 on the frame and to the outer end of said rod is secured the hand wheel 54.

A scale beam 56 is connected to a shaft 57 and said shaft 57 is suspended from eye bolts 58 secured in the frame 5. Castings 59 are shrunk on the shaft 57 at opposite ends thereof and rings 60 in said castings engage the eye bolts 58. Links 61 connect the castings 59 to levers 49. The opposite end of the scale beam 56 is connected by the link 62 to the equalizing bar 63. A link 64 connects the scale beam 56 to the shaft 65. The shaft 65 has the casting 66 shrunk on its ends. Eye bolts 67 are secured in the angle bar 68 connected to the frame 5. Links 69 connect the eye bolts 67 with the castings 66 on the shaft 65. Links 70 connect castings 66 with the levers 48. A short scale beam 71 is connected to the shaft 65 at one end and at its opposite end to the scale beam 56 by means of the link 72. Chairs 73 are secured to the channels 43 to form supports or rests for the trunnions 8 when the cylinder is rotated in the manner hereinafter set forth. Sway rods 45ᵃ are connected to the angles 45ᵇ and to the upright channels 45ᶜ of the main frame. Like sway-rods 45ᵈ are connected to the angles 45ᵉ and the angles 45ᶠ of the main frame. These sway-rods control the lateral and longitudinal movement of the channels 45.

Mounted on the frame is the shaft 74 adapted to rock in its bearings 75. On said shaft is the gate closing lever 76. At one side of said lever is the trip arm 76ᵃ. At the outer end of the shaft 74 is the arm 77 to which is attached the inner end of trip link 78 which is supported at its forward end by brackets 79. Connected to the shaft 74 is the arm 74ᵃ which is connected by the spring 74ᵇ to the frame. This spring returns said shaft to its normal position.

To open the gate I provide the dog 76ᵇ which is adapted to be moved into the path of the lug 12 on the gate. This dog is normally held out of operative position by the spring 76ᶜ. On the rock-shaft 76ᵈ which carries the dog 76ᵇ is the trip-lever 76ᵉ which is in the path of the enlargement 19. An arm 76ᶠ is secured to the shaft 76ᵈ and an operating rod 76ᵍ is connected to the arm 76ᶠ provided with the handle 76ʰ. A trigger 70ᵃ is pivoted to the frame at 70ᵇ, said trigger being adapted to engage the notch 70ᶜ formed in the rim-gear 9. This trigger (as shown in Fig. 10) is operated by a lever 70ᵈ, said lever passing through the slot 70ᵉ in the angle-plate 70ᶠ. Notches 70ᵍ are formed in the lever 70ᵈ and one of said notches engages the angle-plate according as said trigger engages said rim-gear or is disengaged therefrom.

Connected to one end of the equalizing bars 63 are the links 80 which are connected up to the arm 81 pivoted in the eye bolt 82 secured to the frame 5. The opposite end of the arm 81 is connected by links 83 to the scale beam 84, which is balanced on the standard 85. This scale beam is inclosed within the scale beam box 86. I have not deemed it necessary to illustrate in detail all the weighing mechanism as that may be of any desirable form and forms no part of my present invention.

My improved apparatus is adapted to travel beneath the hoppers 87 which are adapted to discharge the material from the bins above. These hoppers are provided with gates 88 which are curved and adapted to move into the arc of a circle upon the central shafts 89. On said shafts are the intermeshing gear wheels so that when one shaft is rotated to open one gate the other shaft will be rotated in the opposite direction and the other gate opened also. Connected to the gate 88 is the rod 90, said rod having secured to its outer end the loop 91. This loop is adapted to engage the arm 92 to the rocking rod 93 extending longitudinally of the machine and supported by the frame. At one end of the rod 93 is the arm 94 which is connected up to the rod 95 operated by the lever 96. By operating the lever 96 the rod 93 is rocked and the arm 92 moves so as to operate to open the doors to permit the material to discharge into the cylinder, as fully hereinafter set forth. The arm 92 is provided with the angular finger 97 which is adapted to guide the arm 92 into engagement with the loop 91 on the lever 90.

Carried by the frame 5 are the trolleys 98 which are adapted to engage the conductors 99 carried in the conduits 100 supported by tracks 101 on the side wall. The truck or carriage may be provided with an ordinary controller 102.

To provide for the braking of the wheels 3 of the truck as well as the wheels 20 which support and rotate the cylinder, I provide in one instance the lever 103 which is provided at its outer end with the pedal 104. The opposite end of said lever is secured to the rock shaft 105. At opposite ends of said shaft 105 are the arms 106 which carry the brake-shoes 107 adapted to engage the wheels 3. A second lever 109 has the treadle 111. This lever is loosely secured to the shaft 105, and has the arms 112 with brake-shoe 113 adapted to engage the wheels 20.

When my improved mixer is in use in a glass factory for mixing the batch the car is run along the track by the motor until it arrives at the sand-hopper of the overhead sand-bin. The operator then grasps the handle of the rod 42 and throws the clutch 34 out of engagement with the gear wheel 32 on the axle 32ª. This brings the car to a standstill. The operator may also employ the brake lever 103 to aid in stopping the car at the proper point. The car is stopped in such position that when the operator then moves the lever 96 the rod 93 is moved over to bring the arm 92 into engagement with the loop 91 on the rod 90, as shown in Fig. 1. The next step in the operation is to rotate the cylinder to bring the opening 11ª into line with the hopper 87 to receive a charge therefrom of sand. The operator grasps the operating rod 39 and by means of said rod throws the clutch 25 into engagement with the gear wheel 24 which is driven by the motor to rotate the cylinder 6. When the opening 11ª is directly beneath the hopper the operator grasps the lever 70ᵈ and raising same releases one of the notches 70ᵍ and moves said lever inward to throw the trigger 70ª into engagement with the notch 70ᵉ on the rim-gear. The lever is then lowered until the second notch engages the angle-plate 70ᶠ and said trigger is locked in place and the cylinder held against accidental rotation. In this manner the opening 11ª of the cylinder is brought under the hopper 37. The gates 88 of said hopper are then opened by operating the lever 96 and the sand is discharged into the cylinder. To weigh the sand discharged into said cylinder the operator grasps the hand wheel 54 of the rod 53ª and turns the same. Owing to the opposite threads on said rod engaging the nuts 51 and 53 the upper ends of the arms 50 and 52 are drawn toward each other and as the outer ends of the levers 48 and 49 bear the load and cannot rise the shafts 46 and 47 will be lifted and will carry with them the channels 45. As said channels are lifted the chairs 73 carried thereby engage the trunnions 8 of the cylinder and said cylinder is thus supported by said channels. In this manner the weight of the cylinder and its contents is transferred onto the scale and by adjusting the weights on the scale beam in the ordinary manner the amount of sand discharged into said cylinder may be accurately weighed. Power is then applied to move the car to the next bin where the proper quantity of lime may be added in the same manner as above set forth, and then the soda-ash and salt cake. Each ingredient is weighed with great accuracy so that a uniform batch is always obtained. As soon as the exact amounts of sand and other ingredients have been deposited in the cylinder the rod 53ª is turned in the opposite direction and the cylinder is lowered until it rests again on the wheels 20. The trigger 70ª is now released from the rim-gear. In order to close the gate or door 11 power is applied to rotate said cylinder clock-wise and the lever 78 is drawn toward the operator which brings the hook on lower end of lever 76 in the path of the lug 12. As said cylinder rotates the gate 11 is moved over the opening 11ª until the spring arm 16 slips between the lugs 17 and the door is locked. Just at the time that this takes place one of the safety lugs or enlargements 19 comes into engagement with one of the trip arms 76ª which acts to rock the shaft 74 and throw the lever 76 to an inoperative position. This allows the cylinder to continue to rotate with the door in its closed position. The safety lug 19 insures the disengagement of the lever 76 from the lug 12. It does not make any difference how long the operator may hold the lever 78 in its forward position he cannot do more than close the gate. Even if in reversing the direction of rotation of the cylinder he should by mistake pull on the lever 78 no damage can result as the curve on the point of the lever 76 allows it to slide over the lug on the gate. After the door is closed the car is then moved to the point where the cylinder is to be discharged over a suitable bin or receptacle located between the tracks, and the cylinder may be rotated for a suitable interval until the thorough admixture of the ingredients has taken place. A part of said rotation may take place during transportation of said mixer if desired. When the car has been brought to a standstill the cylinder is rotated counter-clockwise and the operator pushes in the rod 76ᵍ which brings hook on dog 76ᵇ in path of lug 12. This will arrest the lug 12 and the gate until the enlargement 19 strikes the trip-arm 76ᵈ and said dog 76ª is thrown out of engagement with said lug 12 on said gate. The operator stops the cylinder immediately so as to leave the opening down and directly over the hopper. This will discharge contents from the cylinder to a receptacle beneath same.

What I claim is:

1. In mixing apparatus, the combination with a suitable support, of a cylinder resting thereon, a suspended frame, weighing mechanism from which said frame is suspended, a threaded rod, and connections between said rod and said suspended frame, whereby said frame is lifted by the rotation of said rod and said cylinder is raised from its supporting frame.

2. In mixing apparatus, the combination with a suitable support, of a cylinder resting thereon, weighing mechanism, a frame suspended from said weighing mechanism, arms on said frame having oppositely threaded openings, a rod having threaded portions adapted to engage said openings in said arms, whereby as said rod is rotated said frame is lifted and with it said cylinder.

3. In mixing apparatus, the combination with a suitable support, of a cylinder resting thereon, weighing mechanism, a suspended frame, shafts in said frame, levers on said shafts, links connecting said lever to the beams of said weighing mechanism, arms on said shafts having oppositely threaded openings, and a rod having threaded portions engaging said openings, whereby as said rod is rotated said frame is lifted and with it said cylinder.

4. In mixing apparatus, the combination with a suitable support, of a cylinder resting thereon, weighing mechanism, a frame suspended from said weighing mechanism, chairs on said frame, and means for lifting said frame to support said cylinder on said chairs.

5. In mixing apparatus, the combination with a suitable support, of a cylinder resting thereon, weighing mechanism independently supported on said support, means for lifting said cylinder from said support and transferring the weight of same onto said weighing mechanism, and a trigger on the frame adapted to enter a seat in the periphery of said cylinder.

In testimony whereof, I the said Ross M. Bickley have hereunto set my hand.

ROSS M. BICKLEY.

Witnesses:
 ROBERT C. TOTTEN,
 J. R. KELLER.

---

Copies of this patent may be obtained for five cents each, by addressing the "Commissioner of Patents, Washington, D. C."